Sept. 26, 1933.  L. E. LA BRIE  1,928,059
BRAKE
Filed Sept. 27, 1928  2 Sheets-Sheet 1

INVENTOR.
Ludger E. La Brie
BY
ATTORNEY

Sept. 26, 1933.  L. E. LA BRIE  1,928,059

BRAKE

Filed Sept. 27, 1928  2 Sheets-Sheet 2

INVENTOR.
Ludger E. LaBrie
BY
Jn. W. McConkey
ATTORNEY

Patented Sept. 26, 1933

1,928,059

UNITED STATES PATENT OFFICE 1,928,059

BRAKE

Ludger E. La Brie, South Bend, Ind.

Application September 27, 1928
Serial No. 308,660

9 Claims. (Cl. 188—78)

This invention relates to brakes and is illustrated as embodied in internal expanding brakes for an automobile. An object of the invention is to provide a simple but very powerful brake, by utilizing a novel assembly of shoes or the like to expand and apply a friction band or its equivalent, the band preferably encircling the shoes and shifting lengthwise when the brake is applied to have one part anchor when the drum is turning in one direction and to have another part anchor when the drum is turning in the other direction.

Various features of novelty relate to the shoe arrangement and structure, to the anchorage of the band, to the structure of the band (especially in relation to that of the shoes), to the shoe anchorage, and to various novel and desirable details of construction which will be apparent from the following description of the illustrative embodiments shown in the accompanying drawings, in which.

In both embodiments, the brake includes a rotatable drum 10, at the open side of which is a support such as a backing plate 12, and within which is arranged the friction means of the brake.

Figure 1:
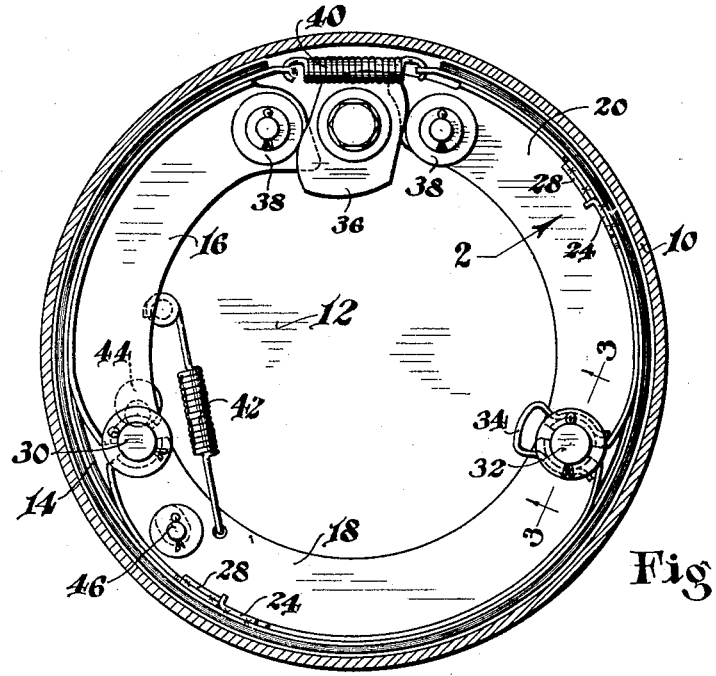
Figure 1 is a vertical section through the brake, just inside the head of the brake drum, and showing the brake friction means in side elevation.
Figure 2:
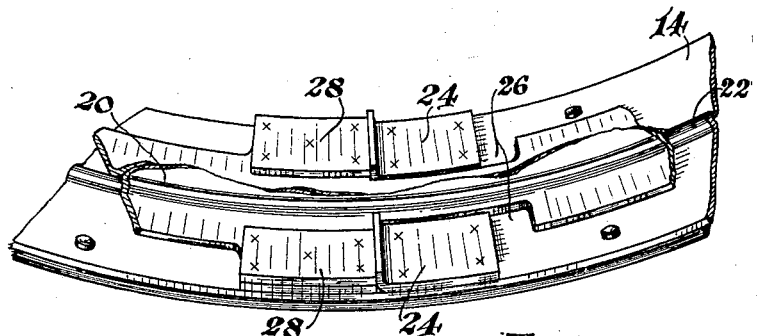
Figure 2 is a perspective, partly broken away, of a portion of the band and one of the shoes, looking generally in the direction of the arrow "2" in Figure 1.
Figure 3:
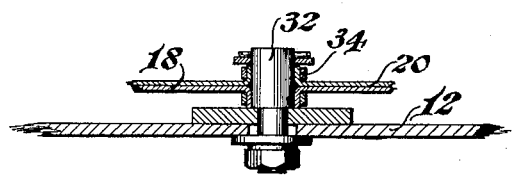
Figure 3 is a partial section through the novel shoe anchorage, on the line 3—3 of Figure 1.
Figure 4:
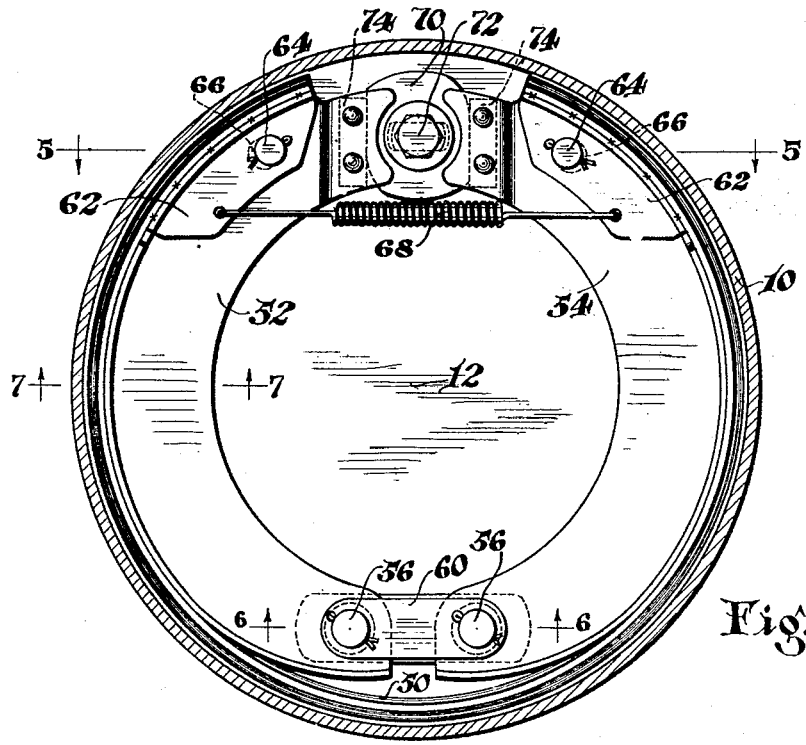
Figure 4 is a section corresponding to Figure 1, but showing a different brake.
Figure 5:
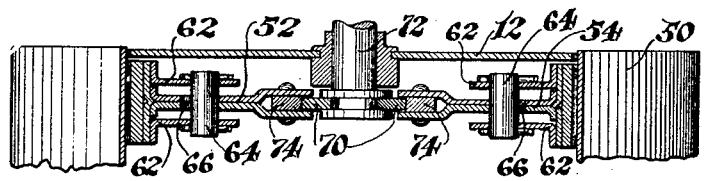
Figure 5 is a partial section through the brake of Figure 4, on the line 5—5 of Figure 4.
Figure 7:
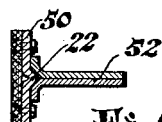
Figure 7 is a partial radial section through the shoe and band assembly, on the line 7—7 of Figure 4.
Figure 6:
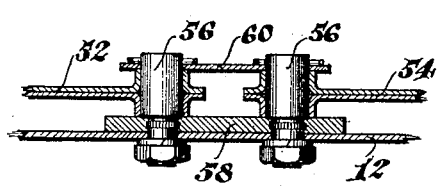
Figure 6 is a partial section through the shoe anchorage of Figure 4, on the line 6—6 of Figure 4.

In the arrangement of Figures 1–3, the friction means includes a band 14 to which the usual lining is riveted or otherwise secured, and which encircles an assembly of primary, secondary, and auxiliary shoes 16, 18, and 20. Each of the shoes is shown formed by welding two L-section stampings back to back, leaving a groove extending lengthwise down the face of each shoe. Band 14 is formed with a rib 22 extending lengthwise and seated in this groove. This prevents relative lateral movement of the band and shoes, while permitting the band to shift lengthwise with respect to the shoes.

Band 14 is arranged to anchor on shoe 18 when the drum is turning clockwise and on shoe 20 when the drum is turning counter-clockwise, and to this end is provided with angular thrust members or stampings 24, spot-welded or otherwise secured to the inner face of the band on opposite sides of rib 22, and seated in cut-out portions 26 of the shoes. These portions are somewhat longer than the thrust members 24, to allow these members freedom of movement away from their anchorages when the anchorage shifts. Shoes 20 and 18 may have laterally-projecting wings, to which plates 28 are preferably spot-welded to make them thicker, against which the members 24 are adapted to anchor.

Shoes 16 and 18 are connected by a floating pivot 30, the shoes being formed with half-sockets seated against the pivot and held there by the brake return springs, while shoes 18 and 20 are formed with similar half-bearings seated against opposite sides of an anchor pivot 32 and held there by the tension of a U-shaped leaf spring 34. The mounting of the anchor pivot 32 in the backing plate is shown in Figure 3. This pivot finally transfers to the backing plate the entire braking torque.

The brake is applied by means such as a pair of cams 36 embracing the ends of shoes 16 and 20 between them and acting against thrust rollers 38 carried by the shoes, the cams acting against the resistance of a main return spring 40 tensioned between the ends of band 14 between cams 36 and the drum, and of a secondary return spring 42 tensioned between shoe 18 and the backing plate. Shoe 18 is urged by spring 42 toward a released position determined by an adjustable eccentric stop 44 engaged by one end of the floating pivot 30. One or more steady rests 46 may be provided for the shoes.

In the brake of Figures 4–7, the friction means includes a band 50 encircling a pair of shoes 52 and 54 mounted on fixed anchor pivots 56 carried by the backing plate, the band having the rib 22 as described above. Anchor pivots 56 are mounted in a reinforcing plate 58 resting against the backing plate, and may have their other ends connected by a tie plate 60.

In this brake, the ends of band 50 are provided with pairs of inwardly-extending members (preferably steel stampings) 62 carrying transverse thrust or anchorage pins 64 passing through slots 66 in the webs of shoes 52 and 54. The return spring 68 in this case is tensioned between members 62 at opposite ends of the band, and the applying means includes a single cam 70 having a rectangular opening shiftably embracing a squared portion of the camshaft 72, the cam acting against hardened thrust pieces 74 riveted or otherwise secured between the spread-apart ends of the stampings making up the shoes 52 and 54. These spread-apart ends project beyond pieces 74 to embrace the cam 70 to hold the shoes laterally.

In this brake, the band 50 anchors on shoe 52 when the drum is turning clockwise, in which case the torque is finally transmitted to the backing plate by the pivot 56 of shoe 52, while if the drum is turning counter-clockwise the band anchors on shoe 54 and the torque is finally transmitted to the backing plate by the other pivot 56.

While two illustrative embodiments have been described in detail, it is not my intention to limit the scope of the invention to those particular embodiments, or otherwise than by the terms of the appended claims. It is not my intention to claim herein any of the subject-matter disclosed in my prior application No. 250,353, filed January 30, 1928.

I claim:

1. A brake comprising a drum, a pair of shoes each having a rim portion formed with an opening, and a shiftable band mounted on the shoe and having inwardly-extending anchoring projections extending into said openings and anchoring on one of said projections when the drum is turning in one direction and on the other of said projections when the drum is turning in the other direction.

2. A brake comprising a pair of shoes having rim portions formed with openings, and a shiftable band mounted on the shoes and having inwardly-extending anchoring projections extending into said openings.

3. A brake comprising a pair of shoes having rim portions formed with openings, and a shiftable band mounted on the shoes, and having inwardly-extending anchoring projections extending into said openings, said band being shiftable lengthwise to anchor on one or the other of said shoes according to its direction of shifting.

4. A flexible substantially rectangular-section friction band having a longitudinal rib and having transverse anchorage projections on opposite sides of said rib.

5. A flexible substantially rectangular-section friction band having a transverse anchorage projection extending crosswise thereof on its inner face.

6. A pivoted brake member having a central stiffening web and an outer rim formed with an opening for lost-motion connection with an anchorage part projecting therethrough.

7. A pivoted brake member having a central stiffening web and an outer rim formed with an opening for lost-motion connection with an anchorage part projecting therethrough, and reinforced adjacent said opening on the inner face of said rim.

8. A brake comprising pivotally anchored shoes having an applying device between their movable ends and having elongated openings adjacent said movable ends, and a band encircling said shoes and having anchor parts extending through said openings.

9. A brake comprising pivotally anchored shoes having a floating applying device between their movable ends and balancing its thrust against said ends and having elongated openings adjacent said movable ends, and a band encircling said shoes and having anchor parts extending through said openings.

LUDGER E. LA BRIE.